US009180647B2

(12) United States Patent
Chen et al.

(10) Patent No.: US 9,180,647 B2
(45) Date of Patent: Nov. 10, 2015

(54) HIGH FLOW POLYMER INTERLAYERS FOR LAMINATED GLASS

(71) Applicant: Solutia Inc., St. Louis, MO (US)

(72) Inventors: Wenjie Chen, Amherst, MA (US); Yinong Ma, Longmeadow, MA (US)

(73) Assignee: SOLUTIA INC., St. Louis, MO (US)

( * ) Notice: Subject to any disclaimer, the term of this patent is extended or adjusted under 35 U.S.C. 154(b) by 62 days.

(21) Appl. No.: 14/070,398

(22) Filed: Nov. 1, 2013

(65) Prior Publication Data

US 2015/0125656 A1 May 7, 2015

(51) Int. Cl.
*C08K 5/00* (2006.01)
*C08K 5/20* (2006.01)
*B32B 17/10* (2006.01)
*B32B 27/30* (2006.01)
*C08K 5/11* (2006.01)

(52) U.S. Cl.
CPC ..... *B32B 17/10596* (2013.01); *B32B 17/10036* (2013.01); *B32B 17/10091* (2013.01); *B32B 17/10605* (2013.01); *B32B 17/10761* (2013.01); *B32B 27/30* (2013.01); *C08K 5/11* (2013.01); *C08K 5/20* (2013.01); *B32B 2250/03* (2013.01); *B32B 2250/05* (2013.01); *B32B 2250/40* (2013.01); *B32B 2329/06* (2013.01); *B32B 2419/00* (2013.01); *B32B 2605/006* (2013.01)

(58) Field of Classification Search
CPC .......... B32B 17/10596; B32B 17/10036; B32B 17/10091; B32B 17/10761; B32B 17/10605; B32B 27/30; B32B 2329/06; B32B 2605/006; B32B 2419/00; B32B 2250/03; B32B 2250/05; B32B 2250/40; C08K 5/11; C08K 5/20
USPC .......................................................... 524/210
See application file for complete search history.

(56) References Cited

U.S. PATENT DOCUMENTS

| 2,282,026 | A | 5/1942 | Bren et al. | |
| 2,282,057 | A | 5/1942 | Hopkins et al. | |
| 4,654,179 | A | 3/1987 | Cartier et al. | |
| 5,137,954 | A | 8/1992 | DasGupta et al. | |
| 5,595,818 | A | 1/1997 | Hopfe et al. | |
| 6,093,471 | A | 7/2000 | Hopfe et al. | |
| 6,825,255 | B2 * | 11/2004 | Yuan et al. | 524/230 |
| 2006/0216501 | A1 * | 9/2006 | Lin et al. | 428/339 |
| 2012/0225287 | A1 | 9/2012 | Keller et al. | |
| 2013/0074931 | A1 | 3/2013 | Chen et al. | |
| 2013/0236693 | A1 | 9/2013 | Lu | |

OTHER PUBLICATIONS

Wade, Bruce; "Vinyl Acetal Polymers;" Encyclopedia of Polymer Science and Technology; 2003; pp. 381-399; vol. 8; John Wiley & Sons, Inc., Hoboken, New Jersey.
Notification of transmittal of the International Search Report and the written opinion of the International Searching Authority or the declaration date of mailing Jan. 8, 2015, received in International Application No. PCT/US2014/62780 Filing Date: Oct. 29, 2014.

* cited by examiner

*Primary Examiner* — Hui Chin
(74) *Attorney, Agent, or Firm* — Michelle Bugbee

(57) ABSTRACT

An interlayer comprised of a high flow, low molecular weight thermoplastic resin, and at least one plasticizer is disclosed. The use of a high flow, low molecular weight thermoplastic resin, and a plasticizer creates synergy allowing the flow of the interlayer to be increased without sacrificing other characteristics typically associated with an increased flow (e.g., increased blocking, decreased mechanical strength, and decreased manufacturing capability). In this regard, the high flow, low molecular weight thermoplastic resin provides a flow improvement, resulting in a high flow interlayer. As a result, a thinner interlayer can be utilized in forming multiple layer panels because the resulting thinner interlayer has improved flow properties.

20 Claims, 1 Drawing Sheet

HIGH FLOW POLYMER INTERLAYERS FOR LAMINATED GLASS

BACKGROUND OF THE INVENTION

1. Field of the Invention

This disclosure is related to the field of polymer interlayers for multiple layer glass panels and multiple layer glass panels having at least one polymer interlayer sheet. Specifically, this disclosure is related to the field of polymer interlayers having improved high flow and reduced thickness or gauge.

2. Description of Related Art

Generally, multiple layer glass panels refer to a laminate comprised of a polymer sheet or interlayer sandwiched between two panes of glass. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window. In regards to the photovoltaic applications, the main function of the interlayer is to encapsulate the photovoltaic solar panels which are used to generate and supply electricity in commercial and residential applications.

The interlayer is generally produced by mixing a polymer resin such as poly(vinyl butyral) with one or more plasticizers and melt processing the mix into a sheet by any applicable process or method known to one of skill in the art, including, but not limited to, extrusion. Other additional additives may optionally be added for various other purposes. After the interlayer sheet is formed, it is typically collected and rolled for transportation and storage and for later use in the multiple layer glass panel, described below.

The following offers a simplified description of the manner in which multiple layer glass panels are generally produced in combination with the interlayers. First, at least one polymer interlayer sheet is placed between two substrates and any excess interlayer is trimmed from the edges, creating an assembly. It is not uncommon for multiple polymer interlayer sheets to be placed within the two substrates creating a multiple layer glass panel with multiple polymer interlayers. Then, air is removed from the assembly by an applicable process or method known to one of skill in the art; e.g., through nip rollers, vacuum bag, vacuum ring, or another de-airing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process known to one of ordinary skill in the art such as, but not limited to, autoclaving.

Generally, two (2) common problems are encountered in the art of manufacturing multiple layer glass panels: delamination and bubbling from inefficient de-airing or de-gassing. Delamination is the splitting or separating of the laminate into the individual layers, e.g., the separating of the substrates from the interlayer. This typically occurs around the edges of the multiple layer glass panel and is usually the result of the breakdown of the bond between the glass and the interlayer by atmospheric moisture attack, panel sealant degradation, and/or excessive stress imposed on the glass. Certain conditions tend to accelerate the manifestation of edge delamination, especially when one or more of the substrates is wavy or warped. If the delamination extends too far into the panel, the structural integrity of the glass panel may become compromised.

De-airing or de-gassing is the removal of the presence of gas or air in a multiple layer glass panel. Gas trapped in a multiple layer glass panel can have a negative or degenerative effect on the optical clarity and adhesion of the panel. During the manufacturing process of laminated multiple layer glass panel constructs, gases can become trapped in the interstitial spaces between the substrates and the one or more polymer interlayers. Generally, this trapped air is removed in the glazing or panel manufacturing process by processes such as vacuum de-airing the construct, nipping the assembly between a pair of rollers or by some other method known to those of skill in the art. However, these technologies are not always effective in removing all of the air trapped in the interstitial spaces between the substrates, especially when one or more of the substrates is wavy or warped. Generally, the presence of a gas in the interstitial spaces of a multiple layer glass panel takes the form of bubbles in the polymer interlayer sheet(s) or pockets of gas between the polymer interlayer sheet(s) and the substrates—known as "bubbling".

Delamination and bubbling are particularly evident and acute when the interlayer is used in conjunction with warped or wavy glass, including, but not limited to, tempered glass, heat strengthened/toughened glass, mismatched glass, bent glass for making windshields, and in photovoltaic applications where additional components are included that cause unevenness. For example, the processing of tempering glass creates some distortion and roller waves, and thus tempered glass is generally not as flat as ordinary annealed glass. In such applications, the waviness of the substrates creates gaps between the substrates themselves and between the substrates and the interlayer(s), resulting in an increased tendency of delamination and bubble formation. Both delamination and bubble formation are undesirable and problematic where the end-product multiple layer glass panel will be used in an application where optical quality or structural integrity is important. Thus, the creation of a near perfect laminated glass essentially free of any gaseous pockets or bubbles is paramount in the multiple layer glass panel manufacturing process. Not only is it important to create a multiple layer glass panel free of gaseous pockets and bubbles immediately after manufacturing, but permanency is also important. It is not an uncommon defect in the art of multiple layer glass panels for dissolved gases to appear (e.g., for bubbles to form) in the panel over time, especially at elevated temperatures and under certain weather conditions and sunlight exposure. More gases or excessive air will be trapped in the laminated panels if glass panels are warped and/or wavy. The excessive air trapped in the laminated panels will significantly reduce the tolerance of the panels for the elevated temperatures and adverse weather conditions, i.e., bubbles could be formed at lower temperatures. Thus, it is also important that, in addition to leaving the laminate production line free from any bubbles or gaseous cavities, the multiple layer glass panel remains gas-free for a substantial period of time under end-use conditions to fulfill its commercial role.

As a measure to prevent delamination and bubbling with warped glass, it has become common to either increase the thickness of the interlayer or the flow of the interlayer (e.g., with an increase in plasticizer loading, or by using a second plasticizer, such as epoxidized vegetable oil alone or in combination with a conventional plasticizer (as disclosed U.S.

Patent Application Publication 20130074931A1, the entire disclosure of which is incorporated herein by reference)), or both. Increasing the flow increases the capability of the interlayer to fill the gaps that are inherent in the use of warped or wavy glass substrates. However, there are several problems with some of these interlayer compositions previously utilized in the art. For example, with an increase in thickness comes an increase in both cost and price. With increase in flow may come other problems, including: blocking, plasticizer exudation (if plasticizer loading is too high), creep, surface roughness formation, decreased mechanical strength, and decreased manufacturing capability.

Blocking is generally known to those of skill in the art as the sticking of polymer interlayers to each other. Blocking can be a problem during the manufacturing, storage and distribution of polymer interlayer sheets, where the polymer interlayer sheets (which in most common processes are stored in rolls) come into contact with each other (such as when they are rolled up). When the flow of the interlayer is increased, generally the interlayer becomes more susceptible to blocking, and as a result, it can be difficult, if not impossible, to separate the polymer interlayer sheets.

Creep is the tendency of the solid interlayer material to slowly move or deform permanently under the influence of stresses. Creep can be problematic because multiple layer glass panels tend to become deformed and elongated as a result of the creep of the interlayer. For example, over time the two glass panels may begin to slide apart from one another. The creep will be more problematic if the multiple layer glass panels are not installed in frames or other mechanical devices that attach to both the front and rear glass panel. Rather, only the rear glass panel is attached to a mounting system. The front glass panel (unsupported) relies on the interlayer to carry its weight and maintain structural integrity and durability of the laminated glass. When the panels are positioned vertically or at an angle, it is often a concern that the weight of the unsupported glass panel may experience 'gravity induced creep' or shift in certain conditions, such as high temperature climates. The creep performance is affected by the environment where the panels are being installed. For example, if the panel is installed in the tropical zone, it will be exposed to a much higher temperature compared to a non-tropical zone. Generally the creep results from the viscoelastic flow of the polymer with time. In some situations, this creep can result in structural defects and decreased mechanical strength of the interlayer and the resultant multiple layer glass panel. Ideally, there will be very little movement (such as less than 1 mm, or less than 0.5 mm), or even no movement or no creep. Increasing flow comes with an increasing tendency for creep problem.

The surface roughness (characterized as Rz) is generally known to those of skill in the art as the measure of the finer surface irregularities in the texture of the interlayer surface, i.e., peaks and spaces there between on the surface of the interlayer sheet distinguished from the imaginary plane of the flattened polymer interlayer sheet. An appropriate level of surface roughness is needed for good de-airing performance during lamination. If the surface roughness is too low, de-airing will become impossible. On the other hand, if the surface roughness is too high, the large surface irregularities in the interlayer will be difficult to remove during lamination, resulting in more gas being trapped in the multiple layer glass panel. Either too low or too high surface roughness will result in poor de-airing performance and cause more bubbling and delamination, as described above.

The degree of surface roughness is at least in part the result of the manufacturing process employed to create the interlayer. Generally, there are two ways to generate surface roughness during manufacturing: by forming "random rough" surfaces through melt fracture during extrusion (see, for example, U.S. Pat. Nos. 5,595,818 and 4,654,179, the entire disclosures of which are incorporated by reference herein), or by imparting a surface on the interlayer sheet by embossing (see, for example, U.S. Pat. No. 6,093,471, the entire disclosure of which is incorporated by reference herein). Surfaces formed by both methods (that is, both random rough and embossed surfaces) will be affected by the rheological properties (such as flow) of the interlayer. For example, an increase in flow may result in a decrease in the surface roughness formed by melt fracture during extrusion (that is, the surface roughness, Rz, may be too low, which will make de-airing more difficult, causing more bubbling and delamination). Again, such bubbling and delamination is undesirable and can result in visual and structural defects as well as decreased mechanical strength of the interlayer and the resultant multiple layer glass panel. In some extreme cases, surface roughness formed by melt fracture will be extremely low (or the sheet will be very smooth) due to the formulation changes for improving flow because there will be no 'fracturing' of the polymer melt to cause the surface irregularities. In such cases where there is very low or no surface roughness level, or even where increased surface roughness is desired (surface roughness levels higher than surface roughness levels formed by melt fracture), embossing techniques have to be employed to produce a surface having a sufficient surface roughness, Rz (such as at least 25 μm, or at least 30 μm, or greater than 30 μm). The embossing process requires additional manufacturing steps and may be a more complicated process, and the end result may be lower efficiency, increased energy costs, and loss of production capacity.

Summarized, delamination and bubbling are common problems in the field of multiple layer glass panels. These common problems are particularly acute when using wavy or warped substrates. In an attempt to correct these problems associated with wavy or warped substrates, it became common to use an interlayer with an increased thickness or flow or both. The increased thickness and/or flow of the previously utilized interlayers, however, resulted in numerous other unfavorable sacrifices, including, but not limited to, increased manufacturing costs (i.e., the costs associated with an increased thickness in the interlayer), blocking, creep, exudation, surface roughness formation, decreased mechanical strength, and decreased manufacturing capability.

SUMMARY OF THE INVENTION

Because of these and other problems in the art, described herein, among other things is a high flow interlayer comprising: a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons; and at least one plasticizer; wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 μm. In some embodiments, the high flow interlayer has a flow of at least about 0.250 mm, measured as the DF135. As used herein, the term "molecular weight" means the weight average molecular weight ($M_w$), as measured by size exclusion chromatography using low angle laser light scattering and relative to polystyrene calibration standards, as further discussed below. In some embodiments, the plasticizer may be selected from the group consisting of: triethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, and dibutyl sebacate. In some embodiments, the high flow interlayer further comprising an anti-blocking agent, and the anti-blocking agent may be a fatty acid amides having the general formula:

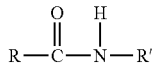

wherein R defines an anti-blocking segment comprising a hydrocarbon chain having about 12 to about 40 carbo atoms, and R' defines H or a hydrocarbon chain having 1 to about 40 carbon atoms. In some embodiments, the high flow interlayer has a surface roughness, Rz, as formed of greater than or equal to about 30 µm, or greater than or equal to about 35 µm. In some embodiments, the high flow interlayer has a creep of less than or equal to 0.5 mm. In embodiments, the high flow interlayer has a glass transition temperature ($T_g$) of from about 20° C. to about 40° C., or from about 25° C. to about 35° C., or from about 30° C. to about 35° C.

In another embodiment, the high flow interlayer disclosed herein comprises: a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons; at least one plasticizer; and an anti-blocking agent; wherein the high flow interlayer has a flow of about 0.235 mm to about 0.335 mm, measured as the DF135, a creep of less than or equal to 1.0 mm, a glass transition temperature ($T_g$) of from about 20° C. to about 40° C., and a surface roughness, Rz, as formed by melt fracture of greater than or equal to about 25 µm. The creep may be less than about 0.5 mm. The high flow interlayer may have a glass transition temperature ($T_g$) of from about 25° C. to about 35° C., or from about 30° C. to about 35° C. In some embodiments, the interlayer is a multilayered interlayer, wherein the interlayer further comprises a second poly(vinyl butyral) layer and a third poly(vinyl butyral) layer, the second poly (vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons and the third poly(vinyl butyral) layer comprising a poly(vinyl butyral) resin having a resin molecular weight ($M_w$) as measured by size exclusion chromatography using low angle laser light scattering of greater than about 180,000 Daltons, wherein the third poly(vinyl butyral) layer is disposed between the first and second poly(vinyl butyral) layers. In some embodiments, the first and second poly(vinyl butyral) layers have a glass transition temperature ($T_g$) of from about 20° C. to about 40° C., or from about 25° C. to about 35° C., or from about 30° C. to about 35° C., and the third poly(vinyl butyral) layer has a glass transition temperature ($T_g$) of from about −10° C. to about 10° C. In some embodiments, the anti-blocking agent comprises a fatty acid amide anti-blocking agent having the general formula:

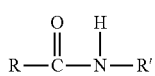

wherein R defines an anti-blocking segment comprising a hydrocarbon chain having about 12 to about 40 carbon atoms, and R' defines H or a hydrocarbon chain having 1 to about 40 carbon atoms.

In an embodiment, a high flow multilayer interlayer comprises: a first poly(vinyl butyral) layer comprising a poly (vinyl butyral) resin having a resin molecular weight ($M_w$) as measured by size exclusion chromatography using low angle laser light scattering of from about 100,000 Daltons to less than about 180,000 Daltons, wherein the first poly(vinyl butyral) layer has a glass transition temperature ($T_g$) of from about 20° C. to about 40° C.; a second poly(vinyl butyral) layer comprising a poly(vinyl butyral) resin having a resin molecular weight ($M_w$) as measured by size exclusion chromatography using low angle laser light scattering of greater than about 180,000 Daltons, wherein the second poly(vinyl butyral) layer has a glass transition temperature ($T_g$) of from about −10° C. to about 10° C.; a third poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons, wherein the third poly(vinyl butyral) layer has a glass transition temperature ($T_g$) of from about 20° C. to about 40° C.; wherein the second poly(vinyl butyral) layer is disposed between the first and third poly(vinyl butyral) layers; at least one plasticizer; and an anti-blocking agent, wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 µm. The creep may be less than about 0.5 mm. In some embodiments, the first and second poly(vinyl butyral) layers have a glass transition temperature ($T_g$) of from about 25° C. to about 35° C., or from about 30° C. to about 35° C., and the third poly(vinyl butyral) layer has a glass transition temperature ($T_g$) of from about −10° C. to about 10° C. In some embodiments, the anti-blocking agent comprises a fatty acid amide anti-blocking agent having the general formula:

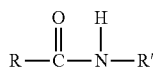

wherein R defines an anti-blocking segment comprising a hydrocarbon chain having about 12 to about 40 carbon atoms, and R' defines H or a hydrocarbon chain having 1 to about 40 carbon atoms. In some embodiments, the high flow interlayer of claim the first and third poly(vinyl butyral) layers have a glass transition temperature ($T_g$) of from about 25° C. to about 35° C., and the multilayer interlayer has a surface roughness, Rz, as formed by melt fracture of greater than or equal to 30 µm. In some embodiments, the high flow interlayer has a surface roughness, Rz, as formed of greater than or equal to about 35 µm.

In an embodiment, the high flow interlayer is disposed between two tempered glass substrates, thereby forming a multiple layer glass panel.

Also disclosed herein is a multiple layer panel comprising: at least one rigid substrate; and a high flow interlayer, wherein the high flow interlayer comprises: a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons; and at least one plasticizer; wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 µm. In embodiments, the plasticizer may be selected from the group consisting of: triethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, and dibutyl sebacate. In embodiments, the high flow interlayer is a multilayered interlayer.

Also disclosed herein is a multiple layer panel comprising: at least one rigid substrate; and a high flow interlayer, wherein the high flow interlayer comprises: a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons; at least one plasticizer; and an anti-blocking agent; wherein the high flow interlayer has a flow of about 0.235 mm to about 0.335 mm, measured as the DF135, a creep of less than or equal to 1.0 mm, a glass transition temperature ($T_g$) of from about 20° C. to about 40° C., and a surface roughness, Rz, as formed by melt fracture of greater than or equal to about 25 μm. The creep may be less than about 0.5 mm. The high flow interlayer may have a glass transition temperature ($T_g$) of from about 25° C. to about 35° C., or from about 30° C. to about 35° C. In some embodiments, the interlayer is a multilayered interlayer, wherein the interlayer further comprises a second poly(vinyl butyral) layer and a third poly(vinyl butyral) layer, the second poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons and the third poly(vinyl butyral) layer comprising a poly(vinyl butyral) resin having a resin molecular weight ($M_w$) as measured by size exclusion chromatography using low angle laser light scattering of greater than about 180,000 Daltons, wherein the third poly(vinyl butyral) layer is disposed between the first and second poly(vinyl butyral) layers. In some embodiments, the first and second poly(vinyl butyral) layers have a glass transition temperature ($T_g$) of from about 20° C. to about 40° C., or from about 25° C. to about 35° C., or from about 30° C. to about 35° C., and the third poly(vinyl butyral) layer has a glass transition temperature ($T_g$) of from about −10° C. to about 10° C. In some embodiments, the anti-blocking agent comprises a fatty acid amide anti-blocking agent having the general formula:

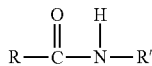

wherein R defines an anti-blocking segment comprising a hydrocarbon chain having about 12 to about 40 carbon atoms, and R' defines H or a hydrocarbon chain having 1 to about 40 carbon atoms.

Also disclosed herein is a multiple layer panel comprising: at least one rigid substrate; and a high flow multilayer interlayer, wherein the high flow multilayer interlayer comprises: a first poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons, wherein the first poly(vinyl butyral) layer has a glass transition temperature ($T_g$) of from about 20° C. to about 40° C.; a second poly(vinyl butyral) layer comprising a poly(vinyl butyral) resin having a resin molecular weight ($M_w$) as measured by size exclusion chromatography using low angle laser light scattering of greater than about 180,000 Daltons, wherein the second poly(vinyl butyral) layer has a glass transition temperature ($T_g$) of from about −10° C. to about 10° C.; a third poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons, wherein the third poly(vinyl butyral) layer has a glass transition temperature ($T_g$) of from about 20° C. to about 40° C.; wherein the second poly(vinyl butyral) layer is disposed between the first and third poly(vinyl butyral) layers; at least one plasticizer; and an anti-blocking agent, wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 μm. The creep may be less than about 0.5 mm. In some embodiments, the first and second poly(vinyl butyral) layers have a glass transition temperature ($T_g$) of from about 25° C. to about 35° C., or from about 30° C. to about 35° C., and the third poly(vinyl butyral) layer has a glass transition temperature ($T_g$) of from about −10° C. to about 10° C. In some embodiments, the anti-blocking agent comprises a fatty acid amide anti-blocking agent having the general formula:

wherein R defines an anti-blocking segment comprising a hydrocarbon chain having about 12 to about 40 carbon atoms, and R' defines H or a hydrocarbon chain having 1 to about 40 carbon atoms. In some embodiments, the high flow interlayer of claim the first and third poly(vinyl butyral) layers have a glass transition temperature ($T_g$) of from about 25° C. to about 35° C., and the multilayer interlayer has a surface roughness, Rz, as formed by melt fracture of greater than or equal to 30 μm. In some embodiments, the high flow interlayer has a surface roughness, Rz, as formed of greater than or equal to about 35 μm.

The multiple layer panel also may further comprise a photovoltaic cell, with the high flow interlayer encapsulating the photovoltaic cell.

In certain embodiments, the rigid substrate is glass. In other embodiments, the multiple layer panel may further comprise a photovoltaic cell, with the interlayer encapsulating the photovoltaic cell.

DESCRIPTION OF THE PREFERRED EMBODIMENT(S)

Figure 1:
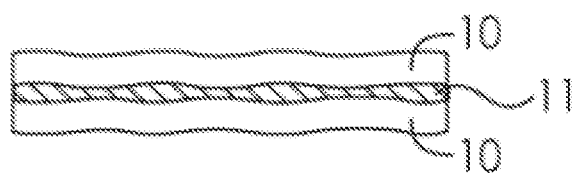
FIG. 1 depicts one embodiment of a high flow interlayer placed between two warped substrates to form a multiple layer glass panel.

Described herein, among other things, are interlayers comprised of a high flow thermoplastic resin having a certain molecular weight level and at least one plasticizer. The use of a high flow thermoplastic resin having a certain molecular weight level and a plasticizer creates synergy allowing the flow of the interlayer to be increased without sacrificing other critical properties typically associated with an increased flow (e.g., increased blocking and creep, exudation, surface roughness formation, decreased mechanical strength, and decreased manufacturing capability). The high flow thermoplastic resin has a lower molecular weight than typical or conventional resins commonly used in the typical or standard interlayers in multiple layer glass panels. As a result, a thinner interlayer can be utilized in forming multiple layer panels because the resulting thinner interlayer has improved flow properties.

The terms "polymer interlayer sheet," "interlayer," and "polymer melt sheet" as used herein, generally may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet.

In various embodiments of the present disclosure, a multilayered interlayer comprises at least two polymer layers (e.g., a single layer or multiple layers co-extruded) disposed in direct contact with each other, wherein each layer comprises a polymer resin, as detailed more fully below. As used herein, "skin layer" generally refers to outer layers of the interlayer and "core layer" generally refers to the inner layer(s). Thus, one exemplary multilayer embodiment would be: skin layer//core layer//skin layer. It should be noted, however, further embodiments include interlayers having more than three layers (e.g., 4, 5, 6, or up to 10 or more individual layers). Additionally, any multilayered interlayer utilized can be varied by manipulating the composition, thickness, or positioning of the layers and the like. For example, in one tri-layer polymer interlayer sheet, the two skin or outer layers may comprise a high flow poly(vinyl butyral) ("PVB") resin, while the middle layer may comprise the same or different PVB resin or different thermoplastic material, or the like. Thus, it is contemplated that the skin layers and the core layer(s) of the multilayered interlayer sheets may be comprised of the same thermoplastic material or different thermoplastic materials and the same or different plasticizer(s).

Although the embodiments described below refer to the polymer resin as being PVB, it would be understood by one of ordinary skill in the art that the polymer may be any polymer suitable for use in a multiple layer panel. Typical polymers include, but are not limited to, PVB, polyurethane, polyvinyl chloride, poly(ethylene-co-vinyl acetate), poly(ethylene-co-(meth)acrylic acid) ionomers, combinations of the foregoing, and the like. PVB, polyurethane, poly(ethylene-co-vinyl acetate), and ionomers are preferred polymers for interlayers. PVB is particularly preferred when used in conjunction with the high flow interlayers of this disclosure.

In order to facilitate a more comprehensive understanding of the high flow interlayer disclosed herein, a summary of common components found in an interlayer, both generally and in interlayers of the present disclosure, and the formation thereof, will be discussed.

The PVB resin is produced by known aqueous or solvent acetalization processes reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a subsidiary of Eastman Chemical Company.

As used herein, residual hydroxyl content (calculated as PVOH) refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the poly(vinyl butyral) resin comprises about 9 to about 35 weight percent (wt. %) hydroxyl groups calculated as PVOH, about 13 to about 30 wt. %, about 9 to about 22 wt. %, or about 15 to about 22 wt. %; and most preferably, for certain embodiments, about 17.75 to about 19.85 wt. % hydroxyl groups calculated as PVOH. The resin can also comprise less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference).

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

Conventional PVB resin for the typical industrial PVB interlayer generally has a molecular weight ($M_w$) of great than about 180,000, preferably about 185,000 to about 250,000 Daltons, as measured by size exclusion chromatography using low angle laser light scattering. To measure molecular weight of the resin, the resin samples were dissolved and analyzed in tetrahydrofuran solvent. Narrow molecular weight distribution polystyrene standard calibration was used to analyze the samples. As used herein, the term "molecular weight" means the weight average molecular weight ($M_w$). The PVB resin used in the interlayers of the present disclosure has a molecular weight of less than about 180,000, preferably from about 100,000 to less than about 180,000.

Various adhesion control agents ("ACAs") can be used in the interlayers of the present disclosure. ACAs in the interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Anti-blocking agents may also be added to the interlayer of the present invention to reduce the level of blocking of the interlayer. Anti-blocking agents are known in the art, and any anti-blocking agent that does not adversely affect the properties of the interlayer may be used. A particularly preferred anti-blocking agent that can be successfully used as in the polymer sheet while not affecting optical properties of the sheet or the adhesive properties of the sheet to glass is a fatty acid amide (see, for example, U.S. Pat. No. 6,825,255, the entire disclosure of which is incorporated herein). The fatty acid amides preferably are amides with the general formula:

wherein R defines an anti-blocking segment comprising a hydrocarbon chain having about 12 to about 40 carbon atoms, and R' defines H or a hydrocarbon chain having 1 to about 40 carbon atoms. These amides include erucamide, behenamide, oleyl palmitamide, stearyl erucamide, erucyl steramide, hydroxystearamide, oleic acid diethanolamide, stearic acid diethanolamide, poly(ethylene glycol) oleic amide, octadecanamide (hereinafter "stearamide"), and mixtures of the foregoing amides. Mono-amides are preferred. Secondary mono-amides are particularly preferred. A particularly preferred secondary mono-amide is N-oleyl palmitamide, which is an amide with a double bond geometry as shown below.

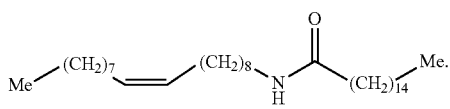

Anti-blocking agents may be added in any suitable amount to the polymer composition. Interlayers of the present invention may have anti-blocking agents in amounts of from about 0.001 phr to about 1.0 phr, or about 0.01 phr to about 0.6 phr, or from about 0.1 phr to about 0.5 phr.

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

The interlayers of the present disclosure comprise at least one plasticizer. In various embodiments of interlayers of the present disclosure, the interlayer can comprise 5 to about 80, about 10 to about 75, about 15 to about 60, about 25 to about 50, about 15 to about 50, about 10 to about 40, about 15 to about 40, about 25 to about 38, about 29 to about 32, and about 30 phr (parts per hundred parts resin) of at least one plasticizer. Of course, other quantities can be used as is appropriate for the particular application.

In some embodiments, the plasticizer has a hydrocarbon segment of fewer than 20, fewer than 15, fewer than 12, or fewer than 10 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, and mixtures thereof. A more preferred plasticizer is 3GEH.

Additionally, other plasticizers, such as high refractive index plasticizers, may also be used in the interlayer of the multiple layer laminate glass panels. Examples of the high refractive index plasticizer include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. Examples of more preferred high refractive index plasticizers are dipropylene glycol dibenzoates and tripropylene glycol dibenzoates.

As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$) values. The glass transition temperature ($T_g$) is the temperature that marks the transition from the glassy state of the interlayer to the elastic state. In general, higher amounts of plasticizer loading will result in lower $T_g$. Conventional, previously utilized interlayers generally have had a $T_g$ in the range of about 0° C. for acoustic (noise reducing) interlayer to about 45° C. for hurricane and aircraft interlayer applications. The interlayers of the present disclosure, comprising a high flow PVB resin, are able to maintain approximately the same glass transition temperature as the previously utilized conventional interlayers, i.e., 0° C. to 45° C. A particularly preferred $T_g$ for certain embodiments (e.g., certain single-layered interlayers comprising high flow PVB resin in combination with a plasticizer) is in the range of about 20° C. to about 40° C., or about 25° C. to about 35° C., or about 30° C. to about 35° C.

An interlayer's glass transition temperature is also correlated with the stiffness of the interlayer—the higher the glass transition temperature, the stiffer the interlayer. Generally, an interlayer with a glass transition temperature of 30° C. or higher increases laminated glass strength and torsional rigidity. A softer interlayer (generally characterized by an interlayer with a glass transition temperature of lower than 30° C.), on the other hand, contributes to the sound dampening effect (i.e., the acoustic characteristics). The interlayers of the present disclosure have glass transition temperatures of about 20° C. or greater, about 30° C. or greater, about 35° C. or greater, about 40° C. or less, from about 20° C. to about 40° C., or in some embodiments, about 10° C. or less, and about 4° C. or less.

The multilayered interlayers of the present disclosure combine these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft). In various embodiments, the multilayered interlayers generally comprise skin layers with a glass transition temperature of about 20° C. to about 40° C., about 25° C. to about 35° C., about 25° C. or greater, about 30° C. or greater, and about 35° C. or greater, and core layer(s) of about 39° C. or greater, about 35° C. or greater, about 35° C. or less, about 10° C. or less, and about 4° C. or less. For example, the following are some preferred multilayered configurations:

$(T_g>25°\ C.)//(T_g<10°\ C.)//(T_g>25°\ C.);$ $(25°\ C.<T_g<40°\ C.)//(T_g<10°\ C.)//(25°\ C.<T_g<40°\ C.);$ $(T_g<35°\ C.)//(T_g>35°\ C.)//(T_g<35°\ C.);$ and $(20°\ C.<T_g<35°\ C.)//(T_g>35°\ C.)//(20°\ C.<T_g<35°\ C.).$ These configurations are merely exemplary and are in no way meant to be limiting to the types of multilayered configurations contemplated by this disclosure.

Additionally, it is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate and photovoltaic module of the present invention are formed using processes known in the art.

Generally, in its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins and plasticizers described above, are pre-mixed and fed into an extruder device. Additives such as anti-blocking agents, colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

In the extruder device, the particles of the thermoplastic raw material and plasticizers, including any of those resin, plasticizer(s), and other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 mils to 60 mils (about 0.38 mm to about 1.52 mm), about 20 mils to about 50 mils (about 0.51 to 1.27 mm), and about 15 mils to about 35 mils (about 0.375 to about 0.89 mm). In multilayer interlayers, each of the skin and core layers of the multilayer interlayer may have a thickness of about 1 mil to 59 mils (about 0.025 to 1.50 mm), 1 mil to about 29 mils (about 0.025 to 0.74 mm), or about 2 mils to about 28 mils (about 0.05 to 0.71 mm). In other applications, the thickness, or gauge, of the polymer interlayer sheet can be greater than 60 mils (1.50 mm) as desired for the particular application. However, when the interlayer is used in conjunction with wavy or warped substrates, it has become common practice to employ interlayers on the thicker end of this range, for example, 30 mils (0.75 mm), 45 mils (1.125 mm), and 60 mils (1.50 mm) or more, depending on the warpage or waviness of the substrates. As discussed more fully below, the formulations described in this invention using the combination of a high flow, low molecular weight PVB resin and at least one plasticizer advantageously allows for the improvement of flow, such as when the laminate is autoclaved, without sacrificing other properties, thereby allowing the use of thinner interlayers; for example, 22 mil (0.55 mm) interlayers can replace the 30 mil (0.75 mm) conventional interlayer and 33 mil (0.825) interlayer can replace the 45 mil (1.125 mm) conventional interlayer in the tempered laminated glass, or any other laminates having mismatched glass pairs. Thus, the cost of materials and manufacturing can be reduced.

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above, and wherein at least one of the interlayers comprises the high flow PVB, low molecular weight PVB resin. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass)//(polymer interlayer)//(photovoltaic cell)//(polymer interlayer)//(glass or polymer film).

The interlayers of the present disclosure will most commonly be utilized in multiple layer panels comprising two substrates, preferably a pair of glass sheets, with the interlayers disposed between the two substrates. An example of such a construct would be: (glass)//(polymer interlayer sheet)// (glass), where the polymer interlayer sheet can comprise multilayered interlayers, as noted above, and wherein at least one of the interlayers comprises high flow, low molecular weight PVB resin. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2 to 5) known in the art and that are commercially practiced include vacuum bag and vacuum ring processes in which a vacuum is utilized to remove the air.

Figure 2:
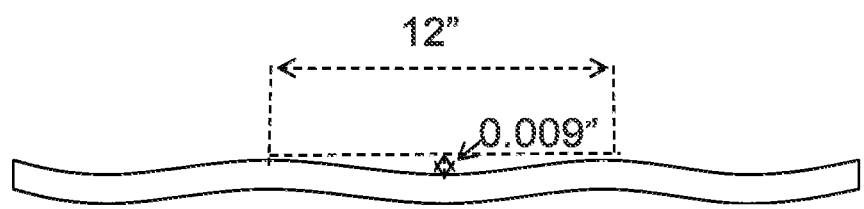
FIG. 2 depicts how typical glass warpage is measured on a glass panel.

Because of increased flow, the interlayers of the present disclosure can be particularly useful with warped glass substrates and other glass with imperfections, including, but not limited to, toughened or tempered glass, heat-strengthened glass, and chemically strengthened glass. Such warped glass substrates are contrasted with annealed (or flat) glass. Warpage is a form of distortion that can occur in many materials, including glass, and usually results from uneven internal or external stresses. For example, as shown with the substrates (10) in FIG. 1, the process of strengthening or toughening glass creates some distortion and roller waves in tempered glass, making it less flat than annealed glass. FIG. 2 is a drawing showing how typical glass warpage is measured on a glass panel. When assembling the two sheets of tempered glass, gaps are created between the substrates themselves and between the substrates and the interlayer. Therefore, a thicker interlayer was generally utilized in the past to adequately bond the warped glass to the interlayer. With the increased flow of the present interlayer (11), the interlayer (11) is able to conform to the distortions and waves of the warped substrates (10), as depicted in FIG. 1. As a result, a thinner interlayer can be utilized with warped substrates while still maintaining superior bonding and without sacrificing other important properties and characteristics of the interlayer.

Although the embodiments described above refer to the interlayers being particularly useful with warped glass substrates, it would be understood by one of ordinary skill in the art that the interlayers would be particularly useful anytime the flow may be important, including, for example, with mismatched glass and in photovoltaic applications (where flow over electrical components is needed), or when utilizing different laminating conditions where a high flow interlayer would improve the final multiple layer panel.

In order to help comprehend the interlayer of the present disclosure, it is also useful to have an understanding of the properties and characteristics associated with a polymer interlayer sheet and methods by which these properties and characteristics of a polymer interlayer sheet are measured. The "flow," as that term is used herein, is measured as the deformation (reduction of sample thickness normalized according to the standard interlayer thickness 0.76 mm) when a certain load pressure (i.e., 11.5 psi) is applied onto the sample surface in the thickness direction and the sample is being heated from 23° C. to 140° C. at 10° C./min heating rate. The flow is commonly measured as the DF135 by a thermo-mechanical analysis apparatus. As an example, a sheet sample of 0.76 mm in thickness is cut into discs having a diameter of 8 mm, and the discs are subjected to the DF135 testing. A flow value of 0.242 mm means that an interlayer with 0.76 mm thickness will deform 0.242 mm in the thickness direction. The flow value is calculated by subtracting the thickness at 135° C. from the thickness at 45° C. measured under the aforementioned conditions to get the deformation value. This value is then normalized to the standard interlayer thickness 0.76 mm. The interlayers of the current disclosure have a flow of greater than about 0.235 mm, greater than about 0.240 mm, greater than about 0.245 mm, greater than about 0.250 mm, greater than about 0.255 mm, greater than about 0.260 mm, greater than about 0.265 mm, greater than about 0.270 mm, greater than about 0.275 mm, greater than about 0.280 mm, greater than about 0.285 mm, greater than about 0.290 mm, greater than about 0.295 mm, greater than about 0.300 mm, or less than about 0.335 mm, less than about 0.330 mm, less than about 0.325 mm, less than about 0.320 mm, less than about 0.315 mm, less than about 0.310 mm, and from about 0.235 mm to about 0.335 mm.

Another parameter used to describe the polymer interlayers disclosed herein is the clarity, which is determined by measuring the haze value or percent. Light that is scattered upon passing through a film or sheet of a material can produce a hazy or smoky field when objects are viewed through the material. Thus, the haze value is a quantification of the scattered light by a sample in contrast to the incident light. The test for percent haze is performed with a hazemeter, such as HunterLab UltraScan XE available from Hunter Associates (Reston, Va.), and in accordance with ATSM D1003-61 (Re-approved 1977)-Procedure A using Illuminant C, at an observer angle of 2 degrees. The interlayers of the present disclosure have a percent haze of less than about 5%, about 3%, about 2%, about 1%, and less than about 1%.

The glass transition temperature also is used to describe the polymer interlayers of the present disclosure. The glass transition temperature ($T_g$) was determined by dynamical mechanical thermal analysis (DMTA). The DMTA measures the storage (elastic) modulus (G') in Pascals, loss (viscous) modulus (G") in Pascals, loss (damping) factor (LF) [tan (delta)] of the specimen as a function of temperature at a given frequency, and temperature sweep rate. A frequency of 1 Hz and temperature sweep rate of 3° C./min were used herein. The $T_g$ is then determined by the position of the loss factor peak on the temperature scale in ° C. The interlayers of the present disclosure have glass transition temperatures of about 20° C. or greater, about 30° C. or greater, about 35° C. or greater, about 40° C. or less, from about 20° C. to about 40° C., or in some embodiments, about 10° C. or less, and about 4° C. or less.

Another parameter used to describe the polymer interlayer disclosed herein is the creep. The creep is measured as follows: laminates are made with two pieces of glass each 3 mm in thickness, and with one piece of glass having an extended (exposed) edge (that is, one piece of glass is longer than the other in one direction). The laminates were then secured on the extended edge of glass and vertically placed in an oven heated to 100° C. The laminates were secured in such a way that the non-secured piece of glass was free to move. Creep is measured by measuring the amount of slippage of the glass on the non-secured side after 100 hours.

Another parameter used to describe the polymer interlayers disclosed herein is the stack sticking peel force, or the amount of force necessary to peel one polymer interlayer from another polymer interlayer after the two polymer interlayers have been stacked upon one another. Stack sticking peel force is a measurement used to predict the occurrence of blocking or the degree of stack sticking of polymer interlayers when stacked under simulated average customer operating conditions.

Generally, the stack sticking peel force of the disclosed interlayers is determined as follows. First, the sheets are conditioned at a certain temperature for a certain period of time to reach a target moisture level. For example, the polymer interlayer sheets are conditioned (generally in a controlled environment, such as a constant temperature and humidity (RH) chamber) at about 37.2° C. for about four (4) hours to reach a target moisture level of about 0.40%. After conditioning, the polymer interlayers are cut into samples of the same size and then assembled into pairs, with each pair being separated by a polyethylene sheet. The pairs are then placed upon one another to simulate a stack. Generally, a minimum of eight (8) pairs and a maximum of fourteen (14) pairs are used in the test. When the stack is completed, substrate covers (any possible substrate is contemplated) will be placed on top of the stack and weights will be placed on top of the substrate covers to impart an additional downward pressure to the stack. The stack is kept under these conditions for a set period time. In one embodiment, the stack is kept under these conditions for about twenty-four (24) hours. Each sheet pair is then separated from the stack and brought to room temperature conditions. In a next step, each of the separated paired sheets are "peeled" from one another with a peel tester (cross-head speed of 12.7 cm per minute) which is configured to peel the interlayers apart at a 90 degree angle. The force required to separate the sheets is then measured (as an average stack sticking peel force for the sample) by dividing the measured force by the width of test strip of the interlayers and is expressed in the unit of pounds per linear inch ("PLI").

Another parameter used to describe the polymer interlayers disclosed herein is the roll blocking performance. Roll blocking performance, as used herein, is a qualitative measure of the interlayer. Roll blocking performance was measured by storing the rolls in the standard horizontal storage package at 35° C.+/−3° C. for one month. After one month, the rolls were unwound at the normal operating conditions. If the force required to unwind the rolls is substantially the same as or similar to the force necessary to unwind standard rolls, the rolls are considered as not blocked. If the force required to unwind the rolls is greater than the force necessary to unwind standard rolls (that is, it is difficult to unwind the rolls), the rolls are considered to be blocked.

Pummel adhesion is another parameter used to describe the polymer interlayers disclosed herein. The Pummel Adhesion Test is widely used throughout the world and has been a standard procedure used by Solutia Inc., a subsidiary of Eastman Chemical Company, for over 30 years. It measures the adhesion level of glass to the interlayer in a laminate construction. The interlayer to glass adhesion has a large effect on the impact resistance and long term stability of glass-interlayer structures. In this test, the laminates are cooled to 0° F. (about −18° C.) and manually pummeled with a 1 lb. (0.45 kg.) hammer on a steel plate at a 45 degree angle. The samples are then allowed to come to room temperature and all broken glass unadhered to the interlayer is then removed. The amount of glass left adhered to the interlayer is visually compared with a set of standards. The standards correspond to a scale (from zero to ten) in which varying degrees of glass remained adhered to the interlayer. For example, at a pummel standard of zero, essentially no glass is left adhered to the interlayer. On the other hand, at a pummel standard of ten, essentially 100% of the glass remains adhered to the interlayer. Pummel values are grouped and averaged for like specimens. Reported values state the average pummel value for the group and the maximum range of the pummel adhesion rating for individual surfaces. The interlayers of the present disclosure have a pummel adhesion rating of greater than 5, greater than 6, and greater than 8.

Another parameter that may be used to measure quality of the interlayer in the multiple layer glass panel is the bake test. The bake test is a method used to evaluate bubble formation, delamination or cloudiness formation in laminates exposed to elevated temperature. The purpose of the bake test is to determine whether the laminated glass will withstand high temperature exposure over an extended period of time without bubble formation, delamination and cloudiness. The higher the temperature required to induce bubble formation, delamination, or cloudiness, the more durable the multiple layer glass panel will be after installation. The industrial bake test standard method may be found in ISO 12543-4. The bake test procedure used to evaluate interlayers and multiple layer glass panels of the invention is as follows: sample laminates are placed vertically in a wooden rack in an oven heated to 100° C. and left in the oven to "bake" for 24 hours. After 24 hours at 100° C., the laminates are removed from the oven and inspected for bubbles, delamination and/or cloudiness. If any bubbles, delamination and/or cloudiness are present, the laminate is considered to have failed the bake test. If there are no bubbles, delamination and/or cloudiness present, the sample passes the bake test.

EXAMPLES

The improvements in flow and other properties of the presently disclosed interlayers (designated as "Disclosed Interlayers" and as shown as DI 1 and DI 2 in the Tables below) can be most readily appreciated by a comparison to standard prior art conventional interlayers (designated as "Conventional Interlayers" and as shown as CI 1 in the Tables below). The Disclosed Interlayers and the Conventional Interlayers were tested for flow, pummel adhesion, peel adhesion and lamination quality after autoclaving (including the bake test) to demonstrate that these other characteristics were not adversely affected. These examples demonstrate the increased flow of the interlayers made with the high flow, low molecular weight PVB resin, along with other advantageous qualities. The Disclosed Interlayers also maintained other important properties, including low stack sticking, high pummel adhesion, acceptable surface roughness (Rz) as formed, and good quality laminates (i.e., no bubbles after lamination or baking).

The sample interlayers were produced by mixing and melt-extruding the mixtures of 100 parts poly(vinyl butyral) resin (having about 17.75 to about 19.85 weight percent residual hydroxyl groups and a vinyl acetate residue of about 1 to 2%), plasticizer(s) (as shown in Table 1), 0.35 phr fatty acid anti-blocking agent (N-oleyl palmitamide), and other common additives such as ACAs. The PVB resin used in the Conventional Interlayers was typical PVB resin, having a molecular weight ($M_w$) in the range of 180,000 to 250,000 (typically about 220,000). The PVB resin used in the Disclosed Interlayers was a low molecular weight resin having a molecular weight in the range of 100,000 to less than 180,000. The molecular weight was measured as previously described, and all molecular weights are all relative to the polystyrene calibration. The amount and type of plasticizer is shown in Table 1. The interlayers were extruded at the thicknesses shown in the Tables. All the interlayer sheets were conditioned to about 0.4 wt % moisture content.

The interlayers were laminated using a conventional nip roll de-airing process at a de-airing temperature of 50° C. to 75° C. using two pieces of tempered glass (each 6 mm in thickness and 2 feet wide by 3 feet long). The lamination yield percent was determined by visually inspecting the finished laminates after the autoclave cycle based on bubbles and delamination, and any laminates having either bubbles or delamination were counted as 'bad'. The lamination yield percent was calculated by dividing the number of good laminates by the total number of laminates tested for each sample and multiplying by 100. For each sample, eight laminates were tested, and the average result was reported. Finished laminates were also subjected to the bake test at 100° C. for 24 hours (using the test method as previously described). At the end of each bake test, the laminates were inspected for bubbles and delamination, and the results are shown in Table 2 below. The laminates and interlayers were also tested for pummel adhesion, peel adhesion, creep, stack sticking and roll blocking (using test methods as previously described), and results are shown in Table 2 and Table 3 below.

TABLE 1

| Sample | Thickness (mils) | Plasticizer (phr) | Type of Plasticizer |
|---|---|---|---|
| DI 1 | 24 | 38 | tri(ethylene glycol) di-(2-ethylhexanoate) |
| DI 2 | 22 | 38 | tri(ethylene glycol) di-(2-ethylhexanoate) |
| CI 1 | 30 | 38 | tri(ethylene glycol) di-(2-ethylhexanoate) |
| CI 2 | 24 | 35 | tri(ethylene glycol) di-(2-ethylhexanoate) |
| CI 3 | 22 | 30 | tri(ethylene glycol) di-(2-ethylhexanoate) |
|  |  | 13 | Epoxidized soybean oil |

TABLE 2

| Sample | Thickness (mils) | Tg (° C.) | Flow (DF135) (μm) | Surface roughness Rz (μm) | Pummel Adhesion | Peel Adhesion (N/cm) | Lamination Yield Post-Autoclave (%) | Percentage of laminates failed the bake test (%) |
|---|---|---|---|---|---|---|---|---|
| DI 1 | 24 | 30.8 | 283 | 30 | 9 | 82.5 | 100 | 0 |
| DI 2 | 22 | 30.8 | 271 | 30 | 9 | 76.0 | 100 | 0 |
| CI 1 | 30 | 31.2 | 184 | 33 | 7.75 | 49.6 | 100 | 12.5 |
| CI 2 | 24 | 32.4 | 232 | 32 | 9 | NT | 100 | 25 |
| CI 3 | 22 | 30.0 | 242 | 12 | NT | NT | NT | NT |

NT—not tested

TABLE 3

| Sample | Thickness (mils) | Creep (mm) | Stack sticking force (N/cm) | Roll blocking |
|---|---|---|---|---|
| DI 2 | 22 | <0.1 | 0 | Not blocked |
| CI 1 | 30 | <0.1 | 0 | Not blocked |

Table 2 demonstrates that use of the high flow, low molecular weight PVB resin instead of a typical or conventional PVB resin (having a higher molecular weight) increases the flow of the interlayer without reducing the adhesion, as compared to Conventional Interlayers. The high flow interlayer also performed better in the bake test, having no failures compared to the Conventional Interlayer. Comparing samples DI 1 and DI 2 to CI 1 shows that by using a high flow, low molecular weight PVB resin (in DI 1 and DI 2) and the same plasticizer at the same level, samples DI 1 and DI 2 have significantly improved flow, adhesion and lamination performance compared to CI 1, even though DI 1 and DI 2 interlayers are thinner than CI 1 interlayer. Sample CI 3, which was produced using a conventional PVB resin (having a higher molecular weight) and a mixture of conventional plasticizer and epoxidized soybean oil has a higher flow than the Conventional Interlayers without the flow aid (the epoxidized soybean oil), but the flow is still not as high as the flow of the Disclosed Interlayers. Additionally, sample CI 3 has a very low surface roughness, Rz, formed by melt fracture, compared to samples DI 1 and DI 2.

A higher flow interlayer, as demonstrated above, can be particularly useful, for example, with tempered or mismatched glass, as the increase in flow allows the interlayer to fill the gaps that are inherent when the two substrates are assembled. The Disclosed Interlayers using the high flow, low molecular weight PVB resin were thinner than the Conventional Interlayers, yet they had higher flow and higher adhesion, and they had better lamination performance.

In conclusion, the interlayers comprising high flow, low molecular weight PVB resin described herein have numerous advantages over conventional interlayers previously utilized in the art. In general, use of the high flow, low molecular weight PVB resin in combination with a plasticizer (without the need for a separate or additional flow aid, such as epoxidized soybean oil) results in decreased processing and raw material costs for manufacturing of multiple layer glass panels and increased efficiency and overall output. In addition to these benefits, in comparison to polymer interlayers previously utilized in the art, the polymer interlayers comprising high flow, low molecular weight PVB resin (the Disclosed Interlayers) as described herein have an increased flow without sacrificing other critical properties that one of ordinary skill in the art would expect with an increase in flow. The Disclosed Interlayers have a combination of high flow, low or no creep, acceptable glass transition temperature and surface roughness, Rz, that is acceptable as formed by melt fracture, eliminating the need for additional manufacturing steps (and associated cost and reduced productivity), such as embossing, to raise the surface roughness level. Additionally, the Disclosed Interlayers have better roll blocking performance and laminate quality than the Conventional Interlayers. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure.

As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content or a molecular weight level in any of the ranges given in addition to comprising a plasticizer(s) in any of the ranges given, where appropriate, to form many permutations that are within the scope of the present disclosure, but that would be cumbersome to list. Further, ranges provided for a genus or a category can also be applied to species within the genus or members of the category unless otherwise noted.

The invention claimed is:

1. A high flow interlayer comprising:
a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons; and
at least one plasticizer;
wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 μm.

2. The high flow interlayer of claim 1, wherein the plasticizer is selected from the group consisting of: triethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, and dibutyl sebacate.

3. The high flow interlayer of claim 2, further comprising an anti-blocking agent.

4. The high flow interlayer of claim 3, wherein the anti-blocking agent is a fatty acid amides having the general formula:

wherein R defines an anti-blocking segment comprising a hydrocarbon chain having about 12 to about 40 carbon atoms, and R' defines H or a hydrocarbon chain having 1 to about 40 carbon atoms.

5. The high flow interlayer of claim 1, wherein the high flow interlayer has a surface roughness, Rz, as formed by melt fracture of greater than or equal to about 30 μm.

6. The high flow interlayer of claim 1, wherein the high flow interlayer has a creep of less than or equal to 0.5 mm.

7. The high flow interlayer of claim 1, wherein the high flow interlayer has a glass transition temperature ($T_g$) of from about 20° C. to about 40° C.

8. The high flow interlayer of claim 7, wherein the high flow interlayer has a glass transition temperature ($T_g$) of from about 25° C. to about 35° C.

9. The high flow interlayer of claim 1, wherein the high flow interlayer has a flow of at least about 0.250 mm to about 0.335 mm, measured as the DF135.

10. A high flow interlayer comprising:
  a poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons;
  at least one plasticizer; and
  an anti-blocking agent;
  wherein the high flow interlayer has a flow of about 0.235 mm to about 0.335 mm, measured as the DF135, a creep of less than or equal to 1.0 mm, a glass transition temperature ($T_g$) of from about 20° C. to about 40° C., and a surface roughness, Rz, as formed by melt fracture of greater than or equal to about 25 μm.

11. The high flow interlayer of claim 10, wherein the interlayer is a multilayered interlayer, and wherein the interlayer further comprises a second poly(vinyl butyral) layer and a third poly(vinyl butyral) layer, the second poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons and the third poly(vinyl butyral) layer comprising a poly(vinyl butyral) resin having a resin molecular weight ($M_w$) as measured by size exclusion chromatography using low angle laser light scattering of greater than about 180,000 Daltons, wherein the third poly(vinyl butyral) layer is disposed between the first and second poly(vinyl butyral) layers.

12. The high flow interlayer of claim 10, wherein the high flow interlayer has a glass transition temperature ($T_g$) of from about 25° C. to about 35° C.

13. The high flow interlayer of claim 11, wherein the first and second poly(vinyl butyral) layers have a glass transition temperature ($T_g$) of from about 20° C. to about 40° C. and wherein the third poly(vinyl butyral) layer has a glass transition temperature ($T_g$) of from about −10° C. to about 10° C.

14. The high flow interlayer of claim 10, wherein the anti-blocking agent comprises a fatty acid amide anti-blocking agent having the general formula:

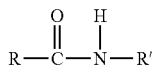

wherein R defines an anti-blocking segment comprising a hydrocarbon chain having about 12 to about 40 carbon atoms, and R' defines H or a hydrocarbon chain having 1 to about 40 carbon atoms.

15. The high flow interlayer of claim 10, wherein the high flow interlayer has a surface roughness, Rz, as formed by melt fracture of greater than or equal to about 30 μm.

16. A high flow multilayer interlayer comprising:
  a first poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons, wherein the first poly(vinyl butyral) layer has a glass transition temperature ($T_g$) of from about 20° C. to about 40° C.;
  a second poly(vinyl butyral) layer comprising a poly(vinyl butyral) resin having a resin molecular weight ($M_w$) as measured by size exclusion chromatography using low angle laser light scattering of greater than about 180,000 Daltons, wherein the second poly(vinyl butyral) layer has a glass transition temperature ($T_g$) of from about −10° C. to about 10° C.;
  a third poly(vinyl butyral) layer comprising a poly(vinyl butyral) resin having a resin molecular weight ($M_w$) as measured by size exclusion chromatography using low angle laser light scattering of from about 100,000 Daltons to less than about 180,000 Daltons, wherein the third poly(vinyl butyral) layer has a glass transition temperature ($T_g$) of from about 20° C. to about 40° C.;
  wherein the second poly(vinyl butyral) layer is disposed between the first and third poly(vinyl butyral) layers;
  at least one plasticizer; and
  an anti-blocking agent,
  wherein the high flow interlayer has a flow of about 0.235 mm to about 0.335 mm, measured as the DF135, a creep of less than or equal to 1.0 mm, and a surface roughness, Rz, as formed by melt fracture of greater than or equal to about 25 μm.

17. The high flow interlayer of claim 16, wherein the first and third poly(vinyl butyral) layers have a glass transition temperature ($T_g$) of from about 25° C. to about 35° C., and wherein the multilayer interlayer has a surface roughness, Rz, as formed by melt fracture of greater than or equal to 30 μm.

18. The high flow interlayer of claim 16, wherein the high flow interlayer has a creep of less than or equal to 0.5 mm.

19. The high flow interlayer of claim 16, wherein the fatty acid amide anti-blocking agent having the general formula:

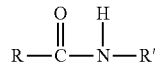

wherein R defines an anti-blocking segment comprising a hydrocarbon chain having about 12 to about 40 carbon atoms, and R' defines H or a hydrocarbon chain having 1 to about 40 carbon atoms.

20. The high flow interlayer of claim 16, wherein the high flow interlayer is disposed between two tempered glass substrates, thereby forming a multiple layer glass panel.

* * * * *